(12) United States Patent
Chen et al.

(10) Patent No.: US 6,546,324 B1
(45) Date of Patent: Apr. 8, 2003

(54) SYSTEM AND METHOD INCORPORATING DYNAMIC FEEDFORWARD FOR INTEGRATED CONTROL OF MOTOR VEHICLE STEERING AND BRAKING

(75) Inventors: Hsien H. Chen, Troy, MI (US); Ashok Chandy, Fenton, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/008,251

(22) Filed: Nov. 13, 2001

Related U.S. Application Data

(63) Continuation-in-part of application No. 09/935,274, filed on Aug. 22, 2001.

(51) Int. Cl.[7] .............................. B62D 5/04; B60T 8/60
(52) U.S. Cl. ............................. 701/48; 701/41; 701/70; 701/78; 701/71; 701/37; 180/140; 180/234; 180/280; 180/282; 477/43; 477/48; 303/100; 303/92
(58) Field of Search .............................. 701/48, 70, 77, 701/78, 71, 74, 80, 37, 41; 180/140, 142, 79.1, 234, 280, 282; 303/100, 92, 106, 109; 477/46, 43, 48

(56) References Cited

U.S. PATENT DOCUMENTS

| | | | | |
|---|---|---|---|---|
| 5,228,757 A | * | 7/1993 | Ito et al. ...................... | 303/100 |
| 5,448,481 A | * | 9/1995 | Asanuma et al. ........... | 180/140 |
| 5,606,502 A | * | 2/1997 | Adachi et al. .............. | 180/408 |
| 5,857,937 A | * | 1/1999 | Ashizawa et al. ............ | 477/46 |
| 6,134,509 A | * | 10/2000 | Furusho et al. ............. | 702/167 |
| 6,181,020 B1 | * | 1/2001 | Uchida et al. ................ | 290/40 |

* cited by examiner

Primary Examiner—Thomas G. Black
Assistant Examiner—Tuan C To
(74) Attorney, Agent, or Firm—Scott A. McBain

(57) ABSTRACT

A control system for a motor vehicle subsystem comprises a reference model and a feedforward controller. The reference model computes desired states of the subsystem. The feedforward controller computes a first control value based on input from the reference model, and computes a second control value based on yaw rate of the vehicle and a control variable for the subsystem.

18 Claims, 3 Drawing Sheets

US 6,546,324 B1

SYSTEM AND METHOD INCORPORATING DYNAMIC FEEDFORWARD FOR INTEGRATED CONTROL OF MOTOR VEHICLE STEERING AND BRAKING

CROSS-REFERENCE TO RELATED APPLICATIONS

This application is a continuation-in-part of Ser. No. 09/935,274, which was filed Aug. 22, 2001, the disclosure of which is hereby incorporated by reference.

TECHNICAL FIELD OF THE INVENTION

The present invention relates to control systems for motor vehicle subsystems, and more particularly to a system and method including a dynamic feedforward feature for integrated control of the motor vehicle steering and brakes.

BACKGROUND OF THE INVENTION

Unified or integrated chassis control systems have been proposed which control the brakes, steering, and suspension of a motor vehicle. The purpose of unified chassis control is to improve vehicle performance in all driving conditions by coordinating control of the chassis subsystems. Unified chassis control systems typically utilize a supervisory control concept that utilizes three fundamental blocks: a reference model, a state estimator, and a vehicle control. The vehicle control element normally incorporates a feedback control. This element computes control values by comparing actual states obtained from the state estimator with desired states from the reference model.

It is well known that when brakes are applied during a steering maneuver, a yaw rate error is induced. It such circumstances, the conventional chassis control systems are relatively slow to compensate.

SUMMARY OF THE INVENTION

The present invention is a system and method for controlling a motor vehicle subsystem. The control system comprises a reference model and a feedforward controller. The reference model computes desired states of the subsystem. The feedforward controller computes a first control value based on input from the reference model, and computes a second control value based on yaw rate of the vehicle and a control variable for the subsystem.

Accordingly, it is an object of the present invention to provide a control system of the type described above which presents a standard methodology to integrate feedforward control into a unified chassis control supervisor that overcomes several known deficiencies.

Another object of the present invention is to provide a control system of the type described above which improves control response.

Still another object of the present invention is to provide a control system of the type described above which allows single-point tuning.

Still another object of the present invention is to provide a control system of the type described above which incorporates dynamic feedforward logic.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
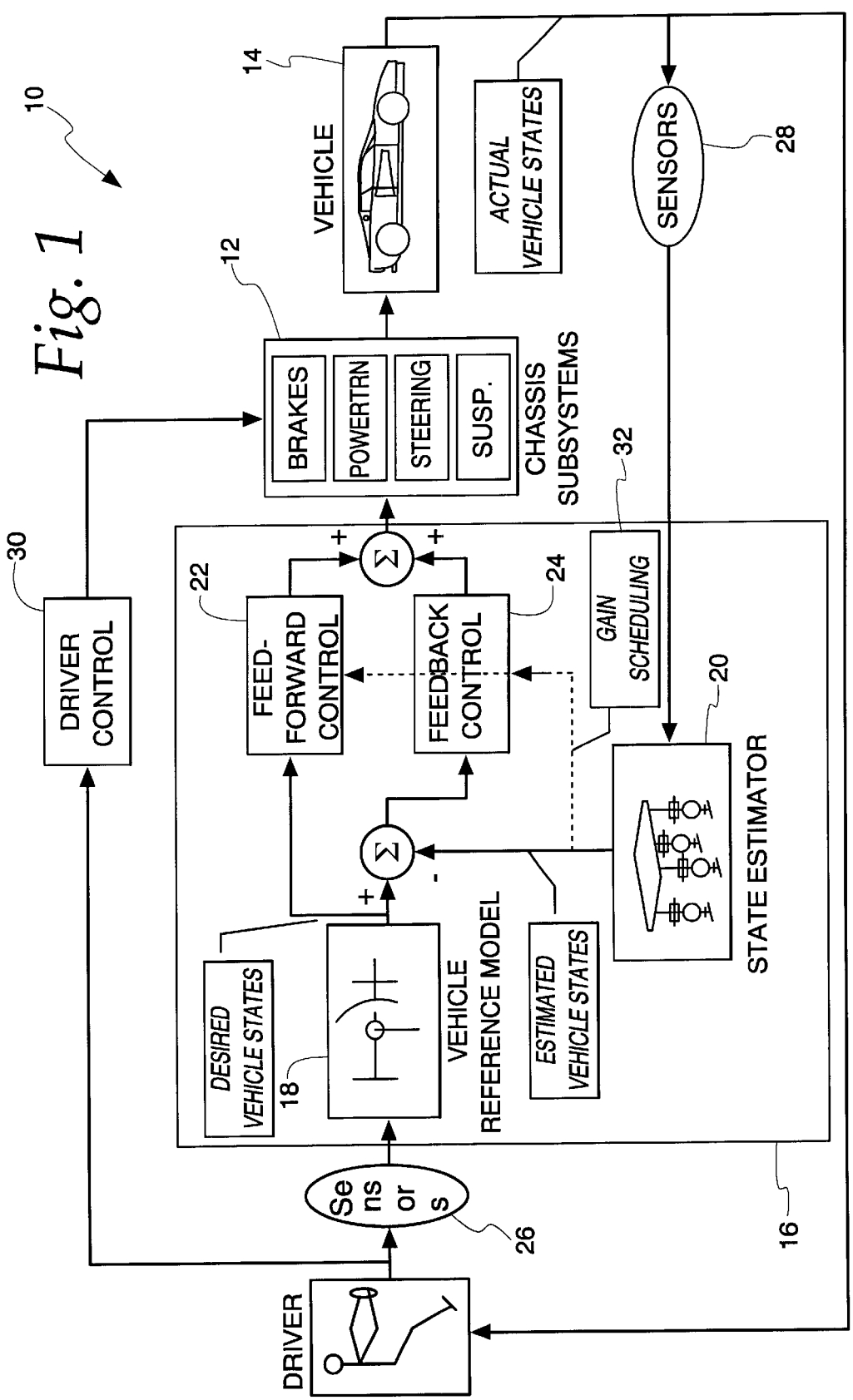
FIG. 1 is a schematic view of a chassis control system according to the present invention for a motor vehicle.

FIG. 1 shows a control system 10 according to the present invention for chassis subsystems 12 of a motor vehicle 14. The chassis subsystems may include front and/or rear steering and braking. A supervisory controller 16 performs many estimation and control functions conventionally performed by the subsystems themselves. The supervisory controller 16 includes a reference model 18, an estimator 20 of vehicle state and environment, and a vehicle level controller including a feedforward controller 22 and a feedback controller 24.

The reference model 18 determines the desired vehicle response, in terms of measureable variables, to driver inputs using measured inputs from sensors 26 and some estimates. The estimator 20 uses measured inputs such as from sensors 26, measured outputs such as from sensors 28, and some preliminary estimates from individual modules to generate estimates of vehicle states which are not measured directly. The estimator 20 may also estimate variables describing potentially relevant environmental effects such as surface coefficient of adhesion, bank angle of the road surface, roughness of the road surface, and others. The supervisory controller 16 uses the desired, measured and estimated values to determine the corrective action on the vehicle level, for example moments and forces acting on the vehicle, that will bring the vehicle response into conformance with the desired response. The supervisory controller 16 also performs partition of control among the subsystems 12. Thus, the supervisory controller 16 decides whether and to what extent to activate any subsystem(s) in a given situation.

The feedforward controller 22 computes a control value based on input from the reference model 18. The present invention optionally provides a driver to chassis-subsystem transfer function 30. In the case of steering, this could represent the transfer function between steering wheel position and road wheel position. In the case of braking, this could represent the transfer function between pedal force and caliper forces at each of the braked wheels of the motor vehicle. This transfer function can be included in the feedforward and feedback control design. For suspension systems, however, this block does not exist. It should be noted that the lines on the block diagram in FIG. 1 show primary control paths. In reality, due to the non-linear nature of vehicle dynamics, the present invention contemplates other links such as bank angle from the state estimator 20 to the feedforward controller 22. A control term based on the driver inputs (inputs to the reference model) are also appropriate and fit the definition of feedforward control.

A dynamic feedforward control is represented by line 32. The dynamic feedforward control is determined by the vehicle yaw-plane dynamics, which can be described by equations using variables for rearwheel steer $\Delta\delta_r$ (if present), front active steer $\Delta\delta_{fc}$, and differential brake $\Delta F_b$ systems. The two degrees-of-freedom bicycle model is described by:

$$X_p = A_p X_p + D_f \theta + D_r \Delta\delta_r + D_{fc}\Delta\delta_{fc} + B_p \Delta F_b$$

$$A_p = \begin{bmatrix} a_{11} & a_{12} \\ a_{21} & a_{22} \end{bmatrix}; B_p = \begin{bmatrix} b_{p1} \\ 0 \end{bmatrix}; D_f = \begin{bmatrix} b_{f1} \\ b_{f2} \end{bmatrix}; D_r = \begin{bmatrix} b_{r1} \\ b_{r2} \end{bmatrix}; D_{fc} = \begin{bmatrix} b_{fc1} \\ b_{fc2} \end{bmatrix}$$

$$X_p = \begin{bmatrix} \varphi \\ V_y \end{bmatrix}$$

where $\phi$ and $V_y$ are the vehicle yaw rate and side slip velocity, respectively, and the system coefficients, $a_{ij}$'s (i=1, 2; j=1,2), $b_{fi}$'s, $b_{ri}$'s, $b_{fci}$'s, $b_{p1}$ are functions of vehicle mass M, vehicle speed $V_x$, vehicle inertia $I_z$, front and rear cornering stiffness $C_f, C_r$, vehicle track width, $t_w$, and the location of vehicle center of gravity described by parameters a and b:

$$a_{11} = \frac{-(a^2 C_f + b^2 C_r)}{I_z V_x}$$

$$a_{12} = \frac{-aC_f + bC_r}{I_z V_x}$$

$$a_{21} = \frac{-aC_f + bC_r}{MV_x} - V_x$$

$$a_{22} = \frac{-(C_f + C_r)}{MV_x}$$

$$b_{r1} = \frac{-bC_r}{I_z}; b_{r2} = \frac{C_r}{M}$$

$$b_{fc1} = \frac{aC_f}{I_z}; b_{fc2} = \frac{C_f}{M}$$

$$b_{p1} = \frac{t_w}{I_z}$$

$$b_{f1} = \frac{aC_f}{I_z}; b_{f2} = \frac{C_f}{M}$$

The actual yaw rate $\phi$ of the vehicle 14 measured by the sensors 28 is mathematically stated from FIG. 1 as $\phi = P_1\theta + P_2 G_s[G_{ff}\phi_r + G_{fb}(\phi - \phi_r)]$. The transfer function to relate the yaw rate, $\phi$, to the road wheel angle, $\theta$, is expressed as $$P_1 = \frac{\varphi}{\theta} = \frac{b_{f1}s + a_{12}b_{f2} - a_{22}b_{f1}}{s^2 - (a_{11} + a_{12})s + a_{11}a_{22} - a_{12}a_{21}}$$

The variable $P_2$ represents the transfer function to relate the yaw rate to the control variables for the rear steer (if present), front active steer, and braking systems. The variables $G_{ref}, G_{ff}, G_{fb}, G_s$ respectively represent the transfer functions for the desired reference model, the feedforward control, the feedback control, and the actuator dynamics shown in FIG. 1.

Assuming that the yaw rate is equal to the desired yaw rate $\phi_r$, the last equation above can be rewritten as $(1 - P_2 G_s G_{ff})\phi_r = P_1\theta$. Assuming further that $\phi_r = G_{ref}\theta$, the general dynamic feedforward transfer function is given by $G_{ff} = P_2^{-1} G_s^{-1} [1 - G_{ref}^{-1} P_1]$.

Rear Steer System

The transfer function to relate the yaw rate to the rear road wheel angle control, if present, is given by $$P_2 = \frac{\varphi}{\Delta\delta_r} = \frac{b_{r1}s + a_{12}b_{r2} - a_{22}b_{r1}}{s^2 - (a_{11} + a_{12})s + a_{11}a_{22} - a_{12}a_{21}}$$

If the desired yaw rate (or reference model) is represented as a first-order transfer function as $$G_{ref} = \frac{K_d}{\tau_d s + 1} \text{ where}$$

$$K_d = \frac{V_x}{L + K_\mu V_x^2}$$

where the variables $K_\mu, L$ respectively represent the understeer coefficient and vehicle length, then the dynamic feedforward part of the rear steer control is given by $$\Delta\delta_r = G_{ff} G_{ref} \theta$$

Where $$G_{ff} = G_p + \frac{G_i}{s - a_{33}} + G_d s$$

$$\text{And } G_p = \left(-a_{11} - a_{22} - \frac{\tau_d b_{f2}}{k_d}a_{12} + \frac{\tau_d b_{f1}}{k_d}a_{22} + G_d b_{r1}a_{33} - \frac{b_{f1}}{k_d}\right) / b_{r1}$$

$$G_i = \left(-\frac{b_{f2}}{k_d}a_{12} + \frac{b_{f1}}{k_d}a_{22} + a_{11}a_{22} - a_{12}a_{21} + b_{r1}G_p a_{33}\right) / b_{r1}$$

$$G_d = \left(1 - \frac{\tau_d b_{f1}}{k_d}\right) / b_{r1}$$

$$a_{33} = \frac{a_{22}b_{r1} - a_{12}b_{r2}}{b_{r1}}$$

Figure 2:
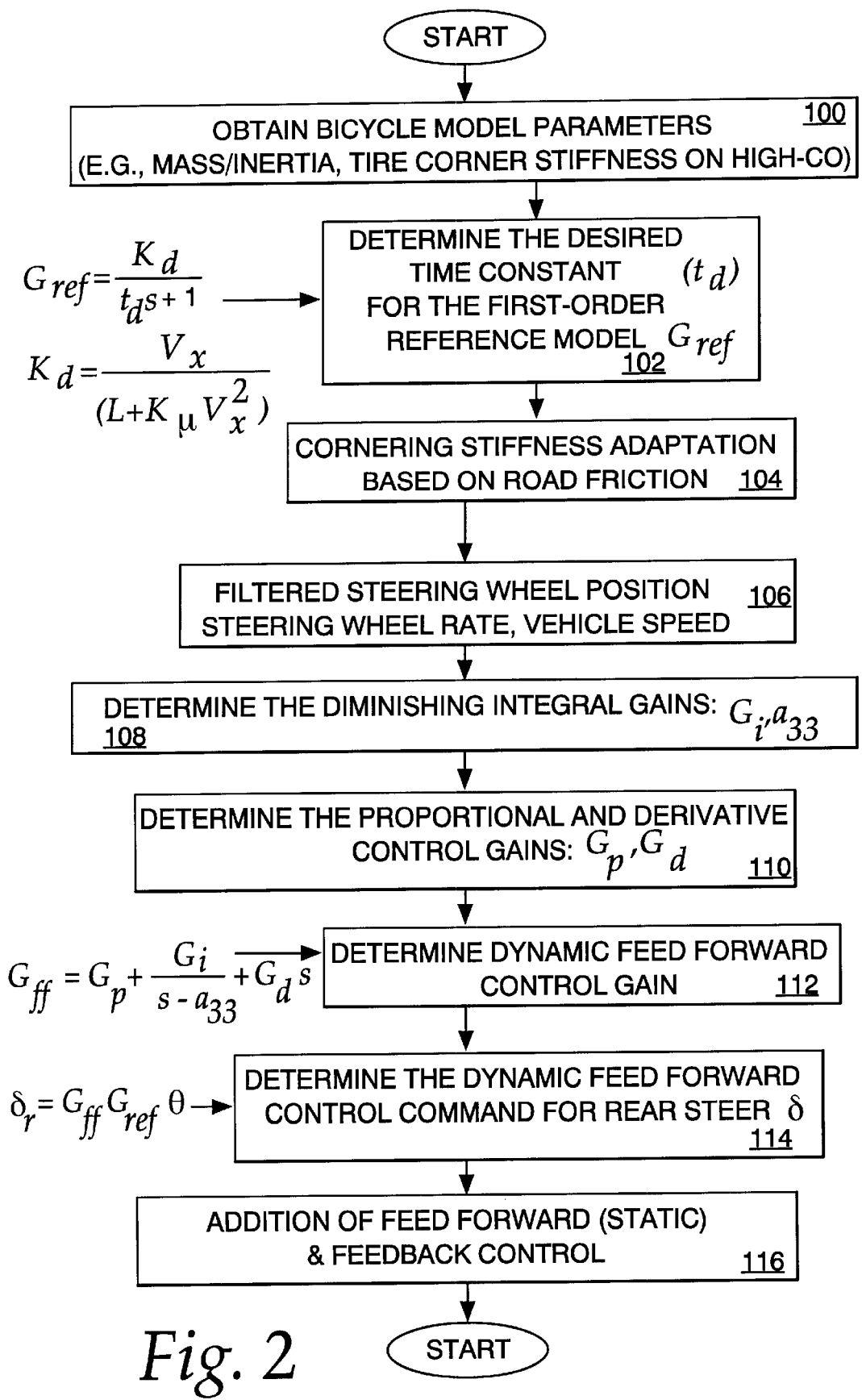
FIG. 2 is a block diagram of a dynamic feedforward control system using a first-order reference model.

The dynamic feedforward control with a proportional term, a derivative term, and a diminishing integrator term of the steering wheel position is employed to achieve the desired dynamic feedforward control function. FIG. 2 shows a dynamic feedforward control method for a rear steer application assuming a first-order transfer function. The bicycle model parameters are first obtained at block 100, and then at block 102 the desired time constant $\tau_d$ is determined according to the equations discussed previously. A cornering stiffness adaptation based on an estimate of road friction is then performed at 104, followed by filtering the steering wheel position, the steering wheel rate, and the vehicle speed as shown by block 106. The diminishing integral gains $G_i$ and $a_{33}$ are then determined at block 108, and the proportional and derivative control gains $G_p$ and $G_d$, respectively, determined at block 110. At block 112, the dynamic feedforward control gain is determined according to the equation discussed above. The dynamic feedforward control command for the rear steer system is then determined at block 114. Finally, the static feedforward and feedback controls are added at block 116 to the dynamic feedforward control to obtain the total steering control command. The dynamic feedforward control gains can be represented as four separate table lookups. For example, when the first-order time constant is assumed to be 0.05 seconds, the proportional, the diminishing integral, and the derivative control gains are plotted as a function of vehicle speed and stored in a computer memory.

If the reference model is modeled as a second-order transfer function as $$G_{\text{ref\_2nd}} = K_d \frac{\omega_d^2(1 + T_1 s)}{s^2 + 2\zeta_d \omega_d s + \omega_d^2}$$

then the dynamic feedforward term of the rear steer control becomes $$G_{ff\_2nd} = \frac{a_1 s^3 + a_2 s^2 + a_3 s + a_4}{b_1 s^2 + b_2 s + b_3}$$

and the rear steer control associated with the dynamic feedforward term is given by $$\Delta\delta_r = G_{ff\_2nd} G_{ref\_2nd} \theta$$

The parameters of the second-order transfer function are:

$$a_1 = T_1 - \frac{b_{f1}}{k_d \omega_d^2}$$

$$a_2 = 1 - T_1 a_7 - \frac{2\zeta_d b_{f1}}{k_d \omega_d} + \frac{a_{22} b_{f1} - a_{12} b_{f2}}{k_d \omega_d^2}$$

$$a_3 = -a_7 + T_1 a_5 + \frac{2\zeta_d}{k_d \omega_d} a_6 - \frac{b_{f1}}{k_d}$$

$$a_4 = a_5 + \frac{a_6}{k_d}$$

$$a_5 = a_{11} a_{22} - a_{12} a_{21}$$

$$a_6 = a_{22} b_{f1} - a_{12} b_{f2}$$

$$a_7 = a_{11} + a_{22}$$

$$b_1 = T_1 b_{r1}$$

$$b_2 = b_{r1} - T_1(a_{22} b_{r1} - a_{12} b_{r2})$$

$$b_3 = a_{12} b_{r2} - a_{22} b_{r1}$$

$$T_1 = \frac{b_{f1}}{a_{12} b_{f2} - a_{22} b_{f1}}$$

The variables $\omega_d$ and $\xi_d$ are the desired natural frequency and damping ratio, which can be defined in the reference model using a single-point tuning approach, to enhance the transient handling performance of the rear steer system.

The dynamic feedforward transfer function $G_{ff\_2nd}$ can be rearranged as the summation of a proportional term, a differential term, and a second-order term as:

$$G_{ff\_2nd} = G_{p\_2nd} + G_{d\_2nd} s + K_p \frac{\omega_p^2 (1 + T_2 s)}{s^2 + 2\zeta_p \omega_p s + \omega_p^2}$$

Where $G_{p\_2nd} = \frac{a_2 b_1 - a_1 b_2}{b_1^2}$

And $G_{d\_2nd} = \frac{a_1}{b_1}$ $$k_p = \frac{d_2}{b_3}$$

$$\varpi_p = \sqrt{\frac{b_3}{b_1}}$$

$$\xi_p = \frac{b_2}{2 b_1 \omega_n}$$

$$T_2 = \frac{d_1}{d_2}$$

$$d_1 = a_3 - \left(\frac{a_1 b_3 + a_2 b_2}{b_1}\right) + \frac{a_1 b_2^2}{b_1^2}$$

$$d_2 = a_4 - \frac{a_1 b_3}{b_1} + \frac{a_1 b_2 b_3}{b_1^2}$$

Figure 3:
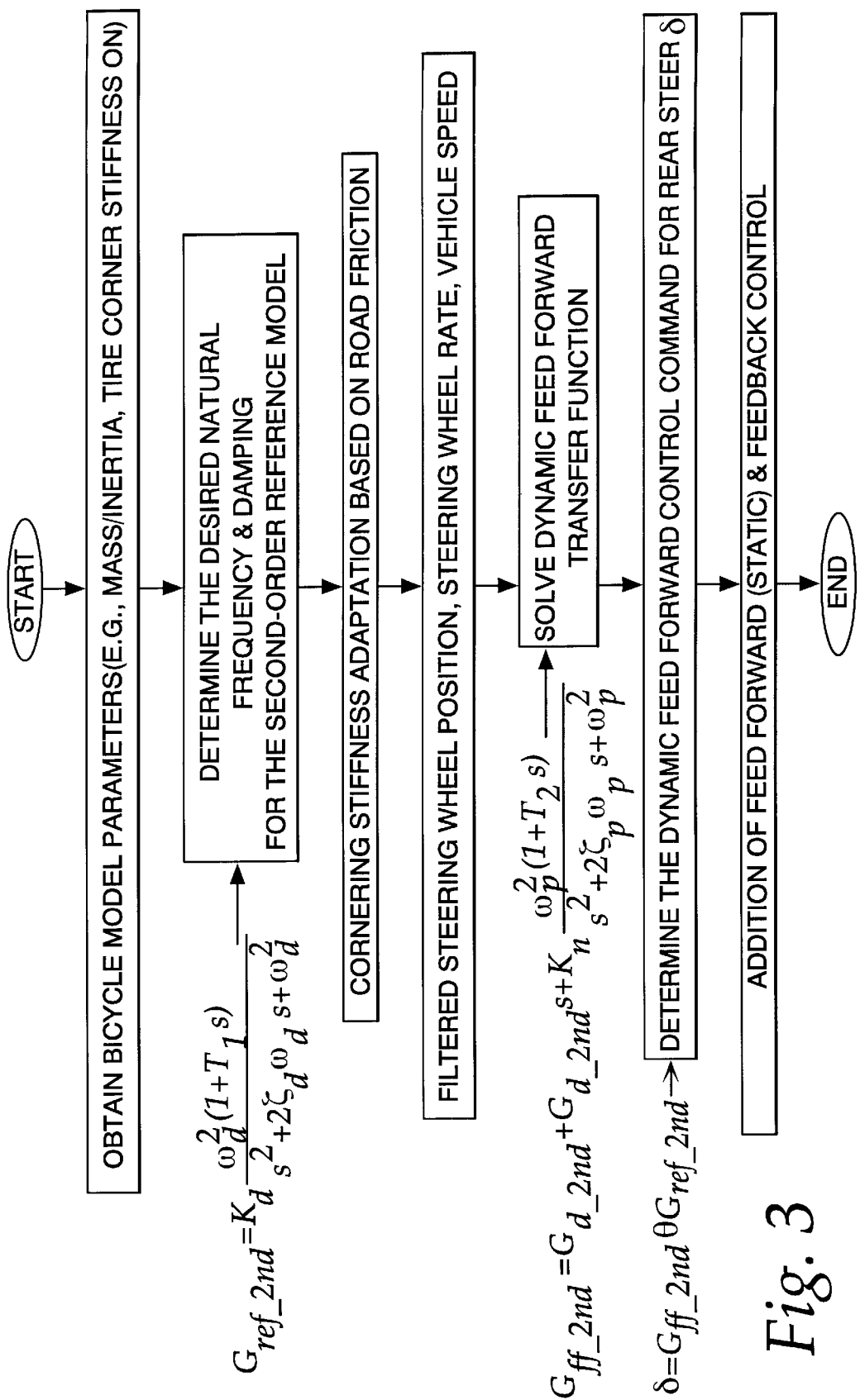
FIG. 3 is a block diagram of a dynamic feedforward control system using a second-order reference model.

The vehicle's natural frequency and damping ratio are preferably generally decreased as the vehicle speed is increased. An advantage of the second-order transfer function is that it allows a driver to choose a desired handling characteristic of a vehicle. FIG. 3 shows the dynamic feedforward control for the rear steer system assuming a second-order reference model. The dynamic feedforward control command can be represented as the summation of a proportional term, a differential term, and an integral term with a second-order transfer function as given above. The dynamic feedforward control gains can be represented as four separate table lookups. For example, when a vehicle handling characteristic with a desired natural frequency of 1.5 Hz and a desired damping ratio of 1.5 are specified, the control gains are represented as a function of vehicle speed and stored in the computer memory. The total rear steer control command is the summation of the static feedforward, the dynamic feedforward, and the feedback control.

Front Active Steer System

The transfer function to relate the yaw rate to the front active steering control is given by:

$$P_2 = \frac{\varphi}{\Delta\delta_{fc}} = \frac{b_{fc1} s + a_{12} b_{fc2} - a_{22} b_{fc1}}{s^2 - (a_{11} + a_{12}) s + a_{11} a_{22} - a_{12} a_{21}}$$

If the reference model is represented as a first-order transfer function, then the dynamic feedforward part of the front active steering control is given by:

$$\Delta\delta_{fc} = G_{ff} G_{ref} \theta$$

$$G_{ff} = G_p + \frac{G_i}{s - a_{33}} + G_d s$$

Where $$G_p = \left(-a_{11} - a_{22} - \frac{\tau_d b_{f2}}{k_d} a_{12} + \frac{\tau_d b_{f1}}{k_d} a_{22} + G_d b_{fc1} a_{33} - \frac{b_{f1}}{k_d}\right) / b_{fc1}$$

$$G_i = \left(-\frac{b_{f2}}{k_d} a_{12} + \frac{b_{f1}}{k_d} a_{22} + a_{11} a_{22} - a_{12} a_{21} + b_{fc1} G_p a_{33}\right) / b_{fc1}$$

$$G_d = \left(1 - \frac{\tau_d b_{f1}}{k_d}\right) / b_{fc1}$$

$$a_{33} = \frac{a_{22} b_{fc1} - a_{12} b_{fc2}}{b_{fc1}}$$

Active Braking System

The transfer function to relate the yaw rate to the active brake control is given by $$P_2 = \frac{\varphi}{\Delta F_b} = \frac{b_{p1}(s - a_{22})}{s^2 - (a_{11} + a_{12}) s + a_{11} a_{22} - a_{12} a_{21}}$$

If the reference model is represented as a first-order transfer function, then the dynamic feedforward part of the active brake control is given by:

$$\Delta F_b = G_{ff} G_{ref} \theta$$

$$G_{ff} = G_p + \frac{G_i}{s - a_{22}} + G_d s$$

Where $$G_p = -\left(a_{11} + \frac{\tau_d b_{f2}}{k_d} a_{12} + \frac{b_{f1}}{k_d}\right) / b_{p1}$$

-continued $$G_i = -\frac{a_{12}}{b_{pl}}\left[a_{21} + \frac{b_{f2}}{k_d}(1 + a_{22}\tau_d)\right]$$

$$G_d = \left(1 - \frac{\tau_d b_{fl}}{k_d}\right)\bigg/ b_{pl}$$

The vehicle's transient handling performance, such as during step steer or slalom maneuvering, can be enhanced by choosing the natural frequency and damping ratio of the vehicle's reference model with a single point tuning approach. The dynamic feedforward control of the active steering and braking integration can be tuned to provide either a first-order or a second-order desired reference model behavior, which is a great benefit in systematically tuning the vehicle to a desired level of handling performance. The addition of dynamic feedforward control reduces the lag in vehicle yaw rate and lateral acceleration responses to steering inputs and enhances the vehicle's directional stability performance as compared to the static feedforward control alone. Furthermore, the feedforward control can provide many of the system dynamics benefits and tunability function if the closed-loop control system is disabled due to failure of, e.g., yaw rate or lateral acceleration sensors.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A control system for affecting a yaw rate signal provided to a motor vehicle subsystem, the control system comprising:
   a reference model which computes desired states of the subsystem;
   a feedforward controller which computes a first control value based on input from the reference model; and
   computes a second control value based on yaw rate of the vehicle and a control variable for the subsystem; and means for affecting the subsystem based on the first and second control values; the second control value is a function of a first-order transfer function.

2. The control system of claim 1 further comprising a state estimator which estimates actual states of the vehicle.

3. The control system of claim 2 further comprising a feedback controller which computes a third control value by comparing the estimates of actual states with desired states.

4. The control system of claim 1 wherein the first control value is a function of vehicle speed.

5. The control system of claim 1 wherein the first control value is a function of an estimate of surface friction.

6. The control system of claim 1 wherein the second control value is a function of a second-order transfer function.

7. The control system of claim 1 wherein the second control value is a function of proportional, derivative, and diminishing integrator terms.

8. The control system of claim 1 wherein the second control value is a function of steering wheel position.

9. The control system of claim 1 wherein the subsystem is a rear wheel steering system.

10. The control system of claim 1 wherein the subsystem is a front wheel steering system.

11. The control system of claim 1 wherein the subsystem is a braking system.

12. A method of controlling a motor vehicle subsystem, the method comprising:
    computing desired states of the subsystem;
    computing a first control value based on the desired states of the subsystem;
    computing a second control value based on yaw rate of the vehicle; and
    affecting the subsystem based on the first and second control values;
    the second control value being a function of a second-order transfer function.

13. The method of claim 12 further comprising estimating actual states of the vehicle.

14. The method of claim 13 further comprising a computing a third control value by comparing the estimates of actual states with desired states.

15. The method of claim 12 wherein the first control value is a function of vehicle speed and an estimate of surface friction.

16. The method of claim 12 wherein the second control value is a function of proportional, derivative, and diminishing integrator terms.

17. The method of claim 12 wherein the second control value is a function of steering wheel position.

18. A method of controlling steering and braking subsystems of a motor vehicle, the method comprising:
    computing desired states of the vehicle;
    computing a first control value for the steering subsystem based on the desired state of the vehicle;
    computing a second control value for the braking subsystem based on the desired state of the vehicle;
    computing a third control value for the steering subsystem based on yaw rate of the vehicle;
    computing a fourth control value for the braking subsystem based on yaw rate of the vehicle;
    affecting the steering subsystem based on the first and third control values, and affecting the braking subsystem based on the second and fourth control values;
    the second control value being a function of proportional, derivative, and diminishing integrator terms.

* * * * *